United States Patent [19]
Metzler

[11] 4,218,260
[45] Aug. 19, 1980

[54] REFLECTIVE CONCRETE BODY, PROCESS FOR THE MANUFACTURE AND UTILIZATION OF THE SAME

[75] Inventor: Heinrich Metzler, St. Gallen, Switzerland

[73] Assignee: Institut für Privatwirtschaft Gschwend & Stadler, St. Gallen, Switzerland

[21] Appl. No.: 1,258

[22] Filed: Jan. 5, 1979

Related U.S. Application Data

[63] Continuation of Ser. No. 847,989, Nov. 2, 1977, abandoned.

[30] Foreign Application Priority Data

Nov. 19, 1976 [CH] Switzerland .................. 14588/76

[51] Int. Cl.² ........................ C04B 7/08; C04B 7/10
[52] U.S. Cl. .............................. 106/98; 404/17
[58] Field of Search ............. 106/97, 98; 350/105; 404/9, 17

[56] References Cited

U.S. PATENT DOCUMENTS

| | | | |
|---|---|---|---|
| 3,417,676 | 12/1968 | Lenoble | 404/9 |
| 3,823,021 | 7/1974 | Jansen | 106/97 |
| 3,964,821 | 6/1976 | Eigenmann | 404/9 |
| 4,049,337 | 9/1977 | Eigenmann | 404/9 |

*Primary Examiner*—James Poer
*Attorney, Agent, or Firm*—Ladas & Parry

[57] ABSTRACT

In a road surface and a process for making same, a top layer of reflex reflective concrete in slab or cylindrical form is made of a mixture of white Portland cement, particulate white quartz filler material, colorless crystal balls and titanium dioxide pigment. The quartz filler is a trigonal trapezohedrical β-quartz powder having a refractive index of 1.55 and a particle size less than the glass ball diameters, the latter being from 0.2 to 0.6 mm. The glass balls constitute from 50 to 70% of the mixture and are arranged within the top layer of concrete in successive layers with those balls closest to the impact surface of the top layer being half exposed to intercept light from car headlamps.

12 Claims, 1 Drawing Figure

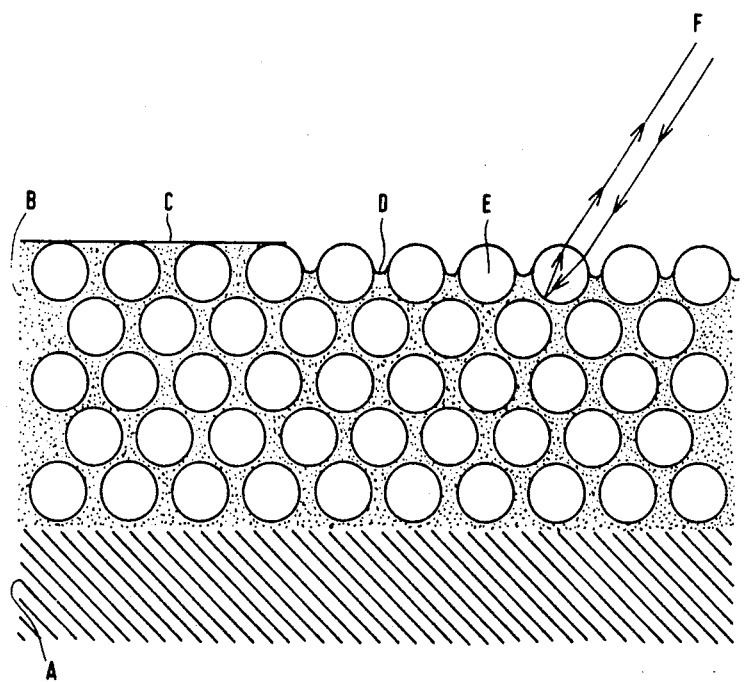

REFLECTIVE CONCRETE BODY, PROCESS FOR THE MANUFACTURE AND UTILIZATION OF THE SAME

This is a continuation of application Ser. No. 847,989 filed Nov. 2, 1977 now abandoned.

The present invention relates to a reflextive concrete body, a process for its manufacture and its use for reflecting markings on road surfaces.

Safety on the roads is a requirement of our time which continues to arise. It is less tiring for car drivers to drive on light roads, thereby reducing the danger of accidents. This is also true of sufficient reflex-markings which reflect the light from headlamps. In Switzerland, two main types of road-surfaces are used, namely black asphalt and concrete.

Black asphalt surfaces are made from a mixture of heated bitumen and gravel, sand and stone chips. After surfacing, the roads have to be compacted with a road roller. At the beginning, asphalt surfaces are black, but lighten over the years to black-grey. They are black when wet.

Concrete is a mixture of portland cement, gravel, sand and water which hardens chemically after mixing and forms a building material. The colour is white, with age the concrete surface becomes white-grey. At night and when wet it remains light grey. The degree of lightening of a concrete road surface is about double that of an asphalt surface. The concrete surface has a service life 3- to 4-times higher than the asphalt surface. The maintenance costs as opposed to the asphalt surface are respectively much lower. On the other hand, the costs for surfacing with concrete are much higher; but the additional expenditure is worthwhile which is why only concrete surfaces are used on motorways.

Reflecting signal colours are often used for marking centre lines, edge lines and pedestrian crossings. One can proceed by using a spray machine to spray a paint binding agent onto the road surface at the same time sprinkling it with fine glass balls. After sufficient drying, the markings produced in this way can be driven over. They light up brightly in the headlamps of a vehicle and are clearly visible at night. The disadvantage is that the service life of these markings is limited and, depending on the intensity of use of the road, they must be renewed at regular intervals. The costs for the repeated renewal are substantial if one considers the relatively short lifetime of the markings produced in this way. Therefore, permanent solutions have been sought for years.

Further, there are the "cats' eyes" which are especially produced in Switzerland and England and which can be built into concrete or asphalt surfaces. One embodiment relates to a structure of electric steel casting which comprises lens systems held in moulding material on its two sides. Another embodiment relates to a casting with a built in rubber part with 2 reflecting-lenses on each side. When driving over these latter cats' eyes, the rubber part is pushed down by the weight of the car; the lenses are cleaned of dust and dirt each time. The reflection effect of this type of signal device is very good but both products have the big disadvantage that they protrude 1 to 2 cms. from the road surface. These signal devices are dangerous for cars moving at high speeds, especially in icy, winter conditions. During snow clearance, the cats' eyes can be ripped out of their anchorage points in the road surface.

It has now been found that durable-reflex-markings may be made of hard concrete and can be built into road surfaces, preferably concrete surfaces.

The reflective concrete body according to the invention is characterized in that it consists at least partly of reflecting concrete, the latter containing portland cement, a hard filler, a pigment and crystal glass balls E, whereby the refractive index of the filler is substantially the same as that of the crystal glass balls, the particle size of the filler being smaller than that of the crystal glass balls and the crystall glass balls being approximately half exposed in the surface of the layer of reflecting concrete.

The reflective concrete should contain preferably (a) white portland cement, (b) a hard white filler, in particular quartz powder, (c) a white pigment, in particular titanium dioxide (rutile), and (d) colourless glass balls, since this gives the best reflective effect. But one can also use coloured portland cement, a coloured filler, a coloured pigment and coloured glass balls.

The concrete body can, for example, have a base A of normal grey concrete which is at least partly covered with a layer of reflective concrete, generally being 8 to 10 mm thick. The filler is preferably quartz powder with the trigonal trapezohedral crystal structure of $\beta$-quartz, with a particle size of up to 0.5 mm, especially up to 0.2 mm, and with a refractive index of at least 1.2, in particular 1.55. The crystal glass balls have preferably a diameter of 0.2 to 0.6 mm, in particular 0.3 mm, and a refractive index of at least 1.55, in particular 1.55. If one uses the preferred pigment, namely titanium dioxide (rutile), an additional lightening of the white portland cement is achieved. Titanium dioxide is shown to have a reflex reflective value of 15% higher than that of e.g. magnesium oxide at an observation angle of 20 degrees, used in a test of reflex reflectors. This value is due to the fact that the mirror reflection component is higher in titanium dioxide than in magnesium oxide. The addition of titanium dioxide in relation to the amount of portland cement, should not exceed 5%.

By compressing the reflective cement body with a pressure of at least 300 kg/cm$^2$, a very compact bonding between the crystal glass balls, portland cement, filler and the pigment is obtained. The reflective concrete is normally vibrated before compression so that about 40 to 50 uniformly packed layers of crystal glass balls are contained in an approximately 10 mm thick layer of reflective concrete. This has the advantage that by abrasion of the first layer of glass balls, the next layer is exposed.

The reflective concrete bodies according to the invention are very weather-resistant and are easily produced and installed in concrete road surfaces. They can be manufactured by mass-production on fully and half automatic production installations. Normally slabs of 3 to 4 cm thickness are produced. But one can also produce cylindrical bodies, e.g. tubes, in centrifugal casting or compression moulding techniques. For the production of central or edge lines, one can use for example slabs with a width of about 10 cm which can be installed in concrete road surfaces end to end or at intervals as markings. The slabs are conveniently installed flat and evenly into the surface so that there are no protruding parts which could cause blows to the vehicles driving over them.

Measurements of white reflective concrete have shown that the reflex reflectivity at an angle of incidence of light from 0 to 50 degrees does not substantially change. It has also been determined that the reflex reflectivity of dry, reflective concrete is 75 times stronger than that of dry, grey concrete. When wet, the reflective concrete still reflects 42 times more strongly than normal grey concrete. The loss of reflex reflectivity in a wet condition mainly depends on the type of wetting.

The layer of reflective concrete can, for example, have the following composition:

|  | Range: | preferably: |
|---|---|---|
| Crystal glass balls | 50 to 70% | 60% |
| Trigonal trapezohedral quartz powder, refractive index 1.55 | 10 to 30% | 20% |
| White portland cement | 15 to 25% | 18% |
| Tritanium dioxide | 1.5 to 4.5% | 2% |
|  |  | 100% |

For the production of a reflective concrete body according to the invention, one can proceed as follows: The mixture of the above mentioned components is firstly thoroughly mixed in a dry condition in a forced circulation mixer and then the necessary quantity of water is added until a thick mortar is formed.

This is filled into steel forms at a thickness of about 10 mm to produce slabs in slab-producing machines. The steel form can also have a lining of rubber or hydrophobic plastic. The form is then thoroughly vibrated whereby the glass balls contained in the mortar are evenly arranged at the bottom of the form. Then normal, grey concrete (core-concrete) is filled into the form and thoroughly vibrated again and compressed at 300 kg per cm². The slabs can be removed from the forms and stored in rows immediately. The full hardening time is 29 to 30 days.

The slabs thus removed from the forms do not yet show any reflective effect because the cement-mixture still covers the top layer of the glass balls (point C in the drawing). The slabs or moulded pieces are now immersed in a 9% solution of phosphoric acid. This corrodes the surface of the white cement. The duration of the corrosion of the surface depends on the diameter of the crystal glass balls. The corrosion should go so far until at least 50% of the top layer of glass balls is still anchored in the concrete, as shown in the drawing at D. With a corrosion period of about 14 to 15 minutes, the top layer with crystal glass balls of 0.3 mm diameter is so exposed that a good 50% of the top glass balls are still anchored in the concrete. For crystal glass balls with a diameter of 0.6 mm, the exposure of the surface takes about twice as long. The slabs are cleaned under running water with a hard brush to remove cement remains. The reflective layer can now develop its effectiveness (point F of the drawing) in that it is now able to reflex reflect the light from car headlamps, whereby an optimum reflex reflection is obtained for a reflective concrete body mounted in road surfaces at an angle of incidence of light of 20 degrees. But even at an angle of incidence of light of for example 50 degrees, excellent results are obtained. This means that the material also shows excellent reflex reflectivity when standing upright.

The reflective concrete bodies according to the invention have very good frost-resistance as well as bending tensile and compressive strength. They are suitable, amongst others, for the following ranges of application.

(a) Road traffic:

Dividing lines in the road surface, bicycle lines in the road surface, pedestrian crossings, in the road surface, curb stones, gutters, sign-posts, curve-posts, pavement edges, marking stones before rail crossings, markings on road and rail tunnels, markings on bridges, markings for stands of traffic police, portable marking stones for building sites and accident spots.

(b) Rail traffic:

Marking of network signals, line signals, point indicators, marking of railway crossings, and tunnel entrances.

(c) Sea traffic:

Marking of harbour piers, bridge piers, harbour dams, landing steps, landing places.

(d) Air traffic:

Marking of landing strips and run-ways, signalization of airports in the military range (night-landings on unlit strips, whereby the reflective concrete markings can be seen only by the pilot in the plane's headlamps), marking of danger zones.

What is claimed is:

1. In a road surface having a top layer of reflex reflective concrete comprising a mixture of cement, hard filler material, glass balls and pigment, the improvement wherein:
   (a) said cement is white Portland cement;
   (b) said hard filler material is particulate white quartz of particle size smaller than that of said glass balls;
   (c) said glass balls are colorless crystal glass balls comprising from 50 to 70% of said mixture and being arranged in a plurality of layers within said top layer of said road surface, the balls of the uppermost of said plurality of layers being exposed approximately to half their diameters; and
   (d) said pigment is titanium dioxide.

2. The improvement according to claim 1 wherein said particulate white quartz is a trigonal trapezohedrical β-quartz powder having a refractive index of 1.55.

3. The improvement according to claim 2, wherein:
   (a) said β-quartz powder comprises from 10 to 30% of said mixture;
   (b) said white Portland cement comprises from 15 to 25% of said mixture; and
   (c) said titanium dioxide comprises from 1.5 to 4.5% of said mixture.

4. The improvement according to claim 3, wherein:
   (a) said colorless crystal glass balls comprise 60% of said mixture;
   (b) said β-quartz powder comprises 20% of said mixture;
   (c) said white Portland cement comprises 18% of said mixture; and
   (d) said titanium dioxide comprises 2% of said mixture.

5. The improvement according to claim 1, 2, 3 or 4, wherein said colorless crystal glass balls have a diameter of from 0.2 to 0.6 mm.

6. In a process for manufacturing a road surface having a top layer of reflex reflective concrete, said top layer being formed by roughly mixing cement, hard filler material, glass balls and pigment in a dry condition, adding sufficient water to the dry mixture to produce a thick wet concrete, filling a form with said wet concrete, compacting said wet concrete in the form, removing the compacted concrete from the form, allowing the removed compacted concrete to harden and thereafter treating a surface area of the hardened concrete with an acid to partially expose those glass balls which are directly adjacent said surface area, the improvement comprising the steps of using white Portland cement as said cement, white quartz particles as said hard filler material, colorless crystal glass balls in an amount of from 50 to 70% of said dry mixture as said glass balls and titanium dioxide as said pigment.

7. The improvement according to claim 6, wherein said white quartz particles have the trigonal trapezohedrical crystal structure of β-quartz and a refractive index of 1.55.

8. The improvement according to claim 7, wherein said white quartz particles comprise from 10 to 30% of said dry mixture, said white Portland cement comprises from 15 to 25% of said dry mixture and said titanium dioxide comprises from 1.5 to 4.5% of said dry mixture.

9. The improvement according to claim 8, wherein said colorless crystal glass balls comprise 60% of said dry mixture, said white quartz particles comprise 20% of said dry mixture, said white Portland cement comprises 18% of said dry mixture and said titanium dioxide comprises 2% of said dry mixture.

10. The improvement according to claim 6, 7, 8 or 9, wherein said colorless crystal glass balls have a diameter of from 0.2 to 0.6 mm.

11. The improvement according to claim 6, wherein said wet concrete is compressed at a pressure of about 300 kg/cm$^2$.

12. The improvement according to claim 6 or 11, wherein the acid used for treating said major surface is phosphoric acid.

* * * * *